(12) United States Patent
Dankworth et al.

(10) Patent No.: US 7,400,678 B2
(45) Date of Patent: Jul. 15, 2008

(54) METHODS IN TRANSMISSION AND SEARCHING OF VIDEO INFORMATION

(75) Inventors: Harald Dankworth, Oslo (NO); Geirr Ivarsson Leistad, Sandvika (NO)

(73) Assignee: Fast Search & Transfer ASA, Oslo (NO)

( * ) Notice: Subject to any disclaimer, the term of this patent is extended or adjusted under 35 U.S.C. 154(b) by 1329 days.

(21) Appl. No.: 10/450,716

(22) PCT Filed: Jan. 4, 2002

(86) PCT No.: PCT/NO02/00002

§ 371 (c)(1),
(2), (4) Date: Jun. 24, 2003

(87) PCT Pub. No.: WO02/054284

PCT Pub. Date: Jul. 11, 2002

(65) Prior Publication Data

US 2004/0031054 A1   Feb. 12, 2004

(30) Foreign Application Priority Data

Jan. 4, 2001 (NO) .................................. 20010056

(51) Int. Cl.
*H04B 1/66* (2006.01)

(52) U.S. Cl. .............................. 375/240.01; 375/240.24; 375/240.23; 375/240.26; 375/240.28; 382/235; 382/246; 709/219; 709/203

(58) Field of Classification Search ............ 375/240.01, 375/240.24, 240.23, 240.26, 240.28; 382/235, 382/246; 709/219, 203
See application file for complete search history.

(56) References Cited

U.S. PATENT DOCUMENTS 5,844,613 A   12/1998   Chaddha
(Continued)

FOREIGN PATENT DOCUMENTS

EP   0 852 445   7/1998
(Continued)

OTHER PUBLICATIONS

Delivering Realaudio or Realvideo from a web server, Real Networks Technical Blueprint Serial, 1998, whole document.
(Continued)

*Primary Examiner*—Shawn An
(74) *Attorney, Agent, or Firm*—Jacobson Holman PLLC (57) ABSTRACT

In a method for transmission of video information between HTTP servers and clients in a shared network resource, particularly Internet, the video information is stored as a video file consisting of packet-divided video streams compression-coded with average bit rates t(c) which cover the clients' expected channel bit rates s. Each packet and the video file are supplied with a header containing information for realizing a bandwidth-scalable video transmission over a suitable version of HTTP. During transmission switching between the video streams takes place on the basis pf an estimation of the channel bit rate s and the information in the packet header, such that the bit rate t(c) is adapted to the client's actual channel bit rate s. In a method for client-executed search and retrieval of video information in a shared network resource, particularly searching of a video frame Fx in a packet-divided video stream, the packets in a video stream are divipacket packet in each group. On basis of given search criteria and search-specific information in the packet headers the packet with the video frame Fx is found, such that a pseudo-random search and retrieval are realized with the use of a suitable version of HTTP as transport protocol.

21 Claims, 6 Drawing Sheets

U.S. PATENT DOCUMENTS

| | | | |
|---|---|---|---|
| 5,898,692 A | 4/1999 | Dunning et al. | |
| 6,128,653 A * | 10/2000 | del Val et al. | 709/219 |
| 6,236,432 B1 * | 5/2001 | Lee | 375/240.26 |
| 6,240,105 B1 | 5/2001 | Zetts | |
| 7,012,964 B1 * | 3/2006 | Nakano et al. | 375/240.28 |

FOREIGN PATENT DOCUMENTS

| | | |
|---|---|---|
| WO | 00/35162 | 6/2000 |
| WO | 00/68834 | 11/2000 |
| WO | 01/19066 | 3/2001 |
| WO | 02/23398 | 3/2002 |

OTHER PUBLICATIONS

A Review of Video Streaming Over the Internet, SuperNova Project, DSTC Technical Report TR97-10, Aug. 1997, whole document.

* cited by examiner

METHODS IN TRANSMISSION AND SEARCHING OF VIDEO INFORMATION

This is a nationalization of PCT/NO02/00002 filed Jan. 4, 2002 and published in English.

The invention concerns a method in transmission on request of video information in a shared network resource, wherein the shared network resource particularly is Internet, an intranet or extranet, wherein the video information is stored in the form of an encoded video file on HTTP servers in the shared network resource and accessed by clients via HTTP (Hypertext Transfer Protocol), wherein each client has a video decoder, and the initial video information is in the form of digitized video signals.

The invention also concerns a method for client-executed search and retrieval of video information in a shared network resource, particularly search and retrieval of a desired frame in a video stream, wherein the shared network resource particularly is Internet, an intranet or extranet, wherein the video information is stored in form of an encoded video file on HTTP servers in the shared network resource and accessed by clients via HTTP (Hypertext Transfer Protocol), wherein each client has a video decoder, wherein the encoded video file is concatenated of multiple encoded video streams which contain the video signals of the video information compressed at an average bit rate t[c] which covers the client's expected channel bit rate a, wherein each encoded video stream is divided into p packets with varying lengths q, wherein each packet comprises a header and payload, wherein the packets in a stream are provided in non-overlapping, successive groups of two or more successive packets, such that each stream is divided in m groups of this kind, wherein the header of the first packet of each group in addition to information of the number n of video frames which the packet contains and references to other packets and streams, is provided with information of a jump offset $d_j$ which corresponds to the combined lengths of the packets in the group and number j frames which the jump offset $d_j$ and the first following packet in the following group comprise, wherein the video file further comprises a header which contains information of the parameters of the streams, wherein the information of the parameters of the streams includes the distances $d_k$ and $d_l$ from the beginning of the video file to respectively the beginning of each stream and to the end of the first packet in each stream, and wherein the transmission of video information takes place bandwidth scalable over a version of HTTP which allows persistent connection and specification of byte range.

In a shared network resource the separate resources will have a varying quality and varying operative parameters such that the shared network resource appears as a heterogeneous communication network without a guaranteed service quality. Even though the invention generally concerns services in shared network resources, the discussion in the following will specifically be directed towards Internet which is the best known and most widespread instance of a publicly available shared network resource. As well-known the bandwidth of the network connections of Internet is very variable. Typically connection bandwidth may vary from 20-500 kilobits/s. As the service quality on Internet cannot be guaranteed, the bandwidth and packet delay for a given connection may fluctuate due to network congestion. This is a serious obstacle for transmitting bandwidth-intensive and time-sensitive data as video information over Internet.

A video signal must be compressed in order to reduce the necessary bandwidth for transmission over Internet. For transmission of the request the signal is compressed once with an average target bit rate. When lossy compression is employed, a distortion is introduced in the decompressed signal. The quality of the decompressed signal is proportional with the target bit rate. The inherent heterogeneity of the Internet poses a dilemma when the target bit rates shall be determined. On one hand the target bit rate should be so high that clients with large target bandwidth receive a high-quality signal, but then clients with small bandwidth will not receive the same signal in real time. On the other hand the target bit rate should be so low that clients with small bandwidth receive the signal in real time, but then clients with large bandwidth will receive a low-quality signal. The solution to this is to use bandwidth-scalable compression. Bandwidth-scalable compression means that the number of subsets with different average target bit rates and corresponding quality can be extracted from the coded signal. When the compressed signal is transmitted to the client, the signal is hence adapted to the client's available channel bandwidth.

Now the prior art shall be discussed. Existing bandwidth-scalable video stream architecture for video streams on demand requires a dedicated video server (see J. Hunter, V. Witana, M. Antoniades, "A Review of Video Streaming over the Internet", DSTC Technical Report TR97-10, August 1997). The client connects to the video server and the server performs bandwidth scaling according to one method or other. The most usual method is encoding several streams with different average bit rates on one file. The server then switches between the streams dependent on the channel bit rate of the clients. This solution has two disadvantages. The first one is that a dedicated video server is necessary to deliver bandwidth scalable video streams on demand and the second one is that firewalls between the video server and the clients must be configured particularly such that the video streams are allowed to pass through.

There are presently also known video stream architectures, which apply HTTP as transport protocol. Such architectures are implemented as follows. The client requests a video file. When the HTTP server receives the request it starts to transmit the video file in a HTTP response to the client. By using HTTP as transport protocol it is not necessary with any dedicated video server, as a HTTP server is sufficient. Further, the stream, being transmitted with HTTP will not normally be blocked by firewalls and hence web browsing will be possible, which increases the number of clients, which are able to receive the stream. The existing video stream architectures based on HTTP have two disadvantages (see RealNetworks Inc., "Delivering RealAudio or RealVideo from a Web Server", RealNetworks Technical Blueprint Series, 1998). The first one is that they are not bandwidth-scalable and the second one is that it is not possible to perform a random search in the video stream.

A suitable version of HTTP as version 1.1 has two interesting properties, namely persistent connection and specification of byte range (see R. Fielding, J. Gettys, J. Mogul, H. Frystyk, T. Berners-Lee, "Hypertext Transfer Protocol— HTTP/1.1", RFC 2068, UC Irvine, DEC, and MIT/LCS, January 1997). Persistent connection means that several HTTP requests can be transmitted over a so-called socket connection, i.e. an identifier for a particular service on a particular node on a network. Hence it is not necessary to reconnect each HTTP request to the server. Byte range specification opens for the possibility to request a subset of the file on the HTTP server. A timer closes the connection if the request is not received by the HTTP server within a predetermined interval. It will further be possible with a large number of requests during one connection, e.g. 100. These two properties of e.g. HTTP version 1.1 are the basis of the present invention.

In order to overcome the disadvantages of the prior art it is a first object of the present invention hence to realize a bandwidth-scalable video transmission with the use of a suitable version of HTTP as transport protocol and further another object to enable pseudorandom searching of video information with the use of a suitable version of HTTP as transport protocol.

The above-mentioned first object and other features and advantages are achieved according to the invention with a method which is characterized by generating by means of a video encoder y multiple encoded video streams which each comprises the video signals of the initial video information compressed with average bit rates t[c] which covers the clients' expected channel bit rates $\sigma$, the video encoder generating independently decodable video frames at given time intervals; generating y encoded intermediate streams from the corresponding encoded video streams by dividing an encoded video stream in p packets with varying lengths q, each packet comprising a header and a payload which contains the encoded video signals for a time segment corresponding to the payload; providing the header with the following information: (i) the distances $d_1$ and $d_2$ respectively from the beginning and to the end of the nearest following packet, (ii) the number n of video frames that the packet comprises, and (iii) a reference to the corresponding packet in respectively the encoded intermediate stream with a closest lower average bit rate $t[c_{k-1}]$ and the coded intermediate stream with a closest higher average bit rate $t[c_{k+1}]$, $t[c_k]$ being the bit rate for the present intermediate stream and k, b, a $\in$ y; providing an independently decodable video frame at the beginning of the payload of a packet; concatenating the intermediate streams into a final file which is stored on one or more HTTP servers; and providing the final file with a header which contains information about the parameters of the streams; and further by the following steps effected by the client: generating a request for the header and the beginning of the first stream in the final file; estimating the channel bit rate a and selecting the stream whose bit rate $t[c_k]$ is the closest bit rate relative to the estimated channel bit rate $\hat{\sigma}$ as the initial stream of the transmission, such that $t[c_k] \approx \sigma$, and then estimating the channel bit rate a during the transmission and, if the estimate $\hat{\sigma}$ is lower than the average bit rate $t[c_k]$ of the current stream, switching to the stream with the closest lower average bit rate $t[c_k]$ or, if the estimate $\hat{\sigma}$ is higher than the average bit rate $t[c_k]$ of the current stream, switching to the stream with the closest higher average bit rate $t[c_{k+1}]$, the switching of the streams taking place on the basis of the packet references and realizing a bandwidth-scaleable video transmission over a version of HTTP which allows persistent connection and specification of byte range.

In an embodiment of the method for transmission according to the invention the channel bit rate $\sigma$ is either estimated on the basis of an estimator $\hat{\sigma}=x/\tau$, wherein $\hat{\sigma}$ is the estimated channel bit rate and x the number of buffered bits in the time interval $\tau$, such that if $\hat{\sigma}>t[c_k]$ and a buffer length less than twice the minimum packet length, switching takes place to the stream with a closest higher target bit rate $t[c_a]$, or, if $\hat{\sigma}<t[c_k]$ and the buffer length less than minimum packet length, switching takes place to the stream with a closest lower target bit rate $t[c_b]$, or on the basis of an estimator $$d\sigma = \frac{d^2x}{dt^2},$$

such that if $\sigma \geq 0$, switching takes place to the stream with a closest higher target bit rate $t[c_a]$, or if $\sigma<0$, switching takes place to the stream with a closest lower target bit rate $t[c_b]$. In the last case a boundary value $\Delta\sigma$ is determined such that switching takes place if $|\sigma| \geq |\Delta\sigma|$. Alternatively can according to the invention the channel bit rate $\sigma$ be estimated by repeatedly integrating the channel bit rate $\sigma$ over succeeding time intervals $\tau = t_a - t_b$, $t_a$ and $t_b$ being respectively an upper and lower boundary for the interval $\tau$ and an integration result $\Sigma$ is given by $$\sum = \int_{t_b}^{t_a} \sigma \, dt,$$

and comparing the integration results $\Sigma_2$, $\Sigma_1$ for respective succeeding time intervals $\tau_2, \tau_1$, such that if $\Sigma_2-\Sigma_1>0$, switching takes place to the stream with a closest higher target bit rate $t[c_a]$, or, if $\Sigma_2-\Sigma_1<0$, switching takes place to stream with a closest lower target bit rate $t[c_b]$, a boundary value $\Delta\Sigma$ preferably being determined such that switching takes place if $|\Sigma_2-\Sigma_1| \geq |\Delta\Sigma|$.

In an advantageous embodiment of the method a transmission according to the invention a HTTP server adapted to HTTP version 1.1 is used and the video transmission then takes place over the same version of HTTP.

In another advantageous embodiment of the method for transmission according to the invention the packets are provided in the streams in non-overlapping successive groups of two or more successive packets, such that each stream is divided into m groups of this kind, and the header of the first packet in a group is provided with information of a jump offset $d_j$ which corresponds to the combined lengths of the packets in the group and the number j of frames which is covered by the jump offset $d_j$ and the first packet in the following group.

In a third advantageous embodiment of the method according to the invention the streams are provided at random in the final file, and the stream with the lowest bit rate $t[c_L]$ refers only to packets of the stream with the closest higher bit rate and the stream with the highest bit rate $t[c_H]$ refers only to packets in the stream with the closest lower bit rate.

In a fourth advantageous embodiment of the method according to the invention the streams are provided successively with the increasing bit rate $t[c]$ in the final file, such that the stream with the lowest bit rate $t[c_L]$ is the first video stream of the file and the stream with the highest bit rate $t[c_H]$ is the last video stream of the file.

Preferably the streams contain an independently decodable video frame at positions corresponding to the beginning of each packet in the current stream.

Preferably the decoded streams contain the same number of video frames.

If the streams have different frame rates, it is according to the invention advantageous defining an adjustment frame as a particular frame type and adjusting the frame rates of each stream to the same rate by inserting a suitable number of adjustment frames in the respective streams.

Preferably is the packet length q at most equal to a configurable request time-out interval for a HTTP server and preferably the encoded streams are processed in parallel frame by frame.

Finally, it is in the method for transmission according to the invention advantageous that the header of the final file comprises information of the number y streams of the file, the average bit rate $t[c]$ of each stream and the distances $d_k$ and $d_l$ from the beginning of the final file to respectively the beginning of each stream and to the end of the first packet in each stream, and additionally that the client on the basis of the parameters of the video streams generates subsets of the streams, the switching between the streams only taking place in these subsets.

The above-mentioned second object is achieved with a method for client-executed search and retrieval of video information in a shared network resource, said method according to the invention being characterized by generating a request to the HTTP server for downloading the header of the first packet in a group in a video stream, comparing the number x of the desired frame with j, and if x∈j, continuing the transmission and decoding of the video stream from and including the first frame of the packet wherein the frame is located, this packet being one of the packets in the group and the first packet in the following group, or, if x∉j, requesting the header of the first packet in the following group, and, as is the case, continuing the process until the desired frame has been found, whereafter downloading and decoding of the stream are continued from and including the first frame in the packet where the desired frame is located, such that a frame-based and packet-formatted search and retrieval of video information are realized with the use of a suitable version of HTTP as a transport protocol.

In the method for client-executed search and retrieval of information advantageously a HTTP server adapted to HTTP version 1.1 and HTTP version 1.1 is used as a transport protocol.

Both in the method for transmission and in the method for client-executed search and retrieval of information it is advantageous generating and maintaining a stack list for HTTP requests, a request being placed in the stack list at transmission and removed therefrom after processing the response received from the HTTP server, and retransmitting the requests in the stack list at reestablished connection after a possible disconnection between the HTTP server and client during the reception of the response. In that connection the first request preferably will be updated if a disconnection takes place during reception of a packet, the beginning of the packet being adjusted for the possibly already received data.

The invention shall now be explained in more detail by means of exemplary embodiments and with reference to the appended drawing figures, wherein.

In the following detailed description of an embodiment of the present invention it is understood that if nothing is expressly stated to the contrary, the shared network resource is represented by Internet and that HTTP version 1.1 is used as a transport protocol. Particularly the present invention achieves bandwidth scalable video transmission with the use of HTTP version 1.1 as a transport protocol by generating a bit stream which is optimized for this purpose. It is particularly suitable using HTTP version 1.1 as transport protocol and this implies that an encoder and a HTTP client must be used which makes bandwidth-scalable video transmission with use of HTTP 1.1 possible with a minimum of overhead. In addition the HTTP client will be able to perform fast search in the compressed video information outside the range already received.

The present invention shall also enable video providers to offer bandwidth-scalable video from a server which is adapted to HTTP version 1.1. The encoding of file is sufficient to cover the bandwidth range of the client and the search option now offered will enable searchable video archives wherein the search is performed on groups of packet in a video stream, possibly with the use of tags that refer to different positions in the video file, as these tags may be provided in a header of the compressed video file. Also, it will no longer be necessary with a dedicated video server.

In the present invention a video stream file format is constructed which allows exploitation of the persistent connection which is offered by versions of HTTP. Particularly, this applies to HTTP-NG versions such as version 1.1. Even more particular for these versions is that they are not disconnected after each request or query from the client, but maintain the connection over a specific number of requests. Simultaneously it is also possible for the client to specify a determined byte range to be transmitted.

Figure 1:
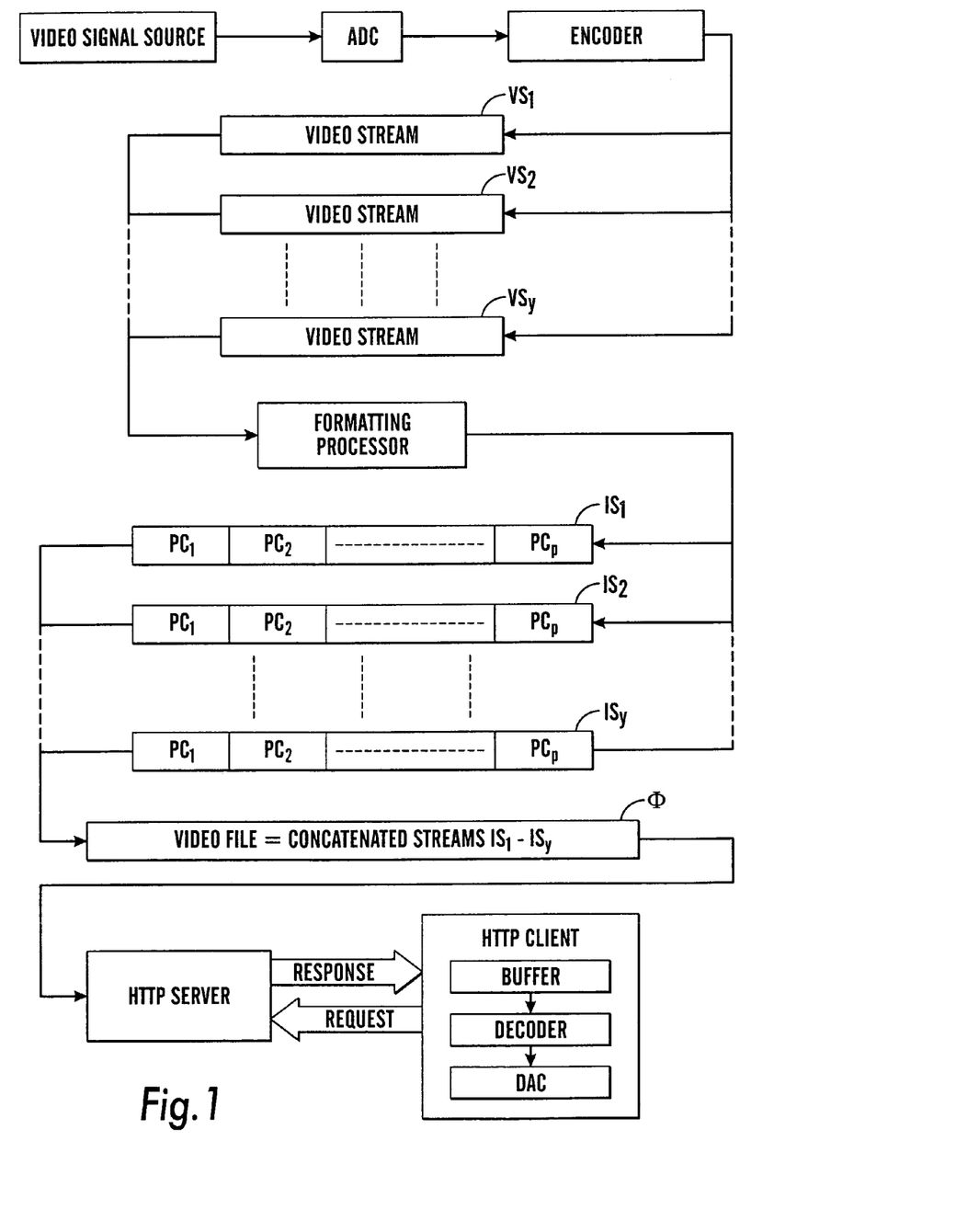
FIG. 1 shows a schematic overview of the generation of the video file as well as the server-client-system applied in the present invention, FIG. 2a the structure of a video file as used in the present invention, FIG. 2b the header of the video file in FIG. 2a, FIG. 3a the packet division of a video stream as used in the video file in FIG. 2a, FIG. 3b the composition of a packet in the video stream in FIG. 3a, FIG. 3c the header of the packet in FIG. 3b, FIG. 4 schematically the principle for achieving bandwidth scaling when switching between video streams, FIG. 5a how a video stream is divided in groups of packets, FIG. 5b the structure of the separate group in the video stream in FIG. 5a, FIG. 5c the composition of the packets in the video streams in FIG. 5b, FIG. 5d the header of the first packet in a group in the video stream in FIG. 5a, FIG. 6a a buffer memory provided before the decoder of the client, and FIG. 6b the flow diagram of a preferred embodiment of the pseudorandom switching of video information transmitted with the method for transmission according to the invention.

FIG. 1 shows schematically the generation of a video file which allows bandwidth-scalable transmission and the system layout for the transmission with the use of HTTP version 1.1 as transport protocol. A video signal source generates video signals which are delivered to an analog/digital converter ADC which digitizes video signals which are delivered to an encoder which generates y multiple encoded video signals $VS_1$-$VS_y$. The encoder compression-codes the video signals with respective average bit rates t[c] such that these cover the expected channel bit rates for transmission to the clients. For instance six video streams $VS_1$-$VS_6$ can be generated containing the same video information, but are respectively encoded with average bit rates of 22, 45, 60, 120, 256 and 512 Kb/s. Thus it becomes possible with a bandwidth-scalable video transmission in the range 20-500 Kb/s. It is necessary that the video encoder generates independently decodable video frames (IF) at given time intervals. Such video frames IF are known as intra-video frames for hybrid video codecs. The encoded video streams VS are now formatted into y encoded intermediate streams IS, e.g. by means of a formatting processor, as an encoded video stream VS is divided into p packets PC. These packets PC may have a varying lengths q and each comprise a header $H_{PC}$ and a payload PL which contains the encoded video signals for a time segment which corresponds to the payload. The video streams IS now encoded and formatted are then concatenated into a video file Φ for storage on the HTTP server, particularly a server for HTTP version 1.1 and can on request from an HTTP client be down-loaded thereto. As shown in FIG. 1, the down-loaded video file is buffered on a cache memory of suitable size in the HTTP client and is then decoded by the client's decoder, the decoding, of course, taking place with an average bit rate t[c] which corresponds to the encoding bit rate for the current stream. After the decoding a digital/analog conversion takes place in the client's digital/analog converter DAC, whereafter the received video information can be stored on an analog medium or reproduced on a suitable playback device. This is trivial and hence not shown in FIG. 1.—It is to be remarked that it is not necessary with a separate extra cache or buffer memory for the decoder, as there in the method for transmission continuously takes place a tuning between the bit rate t[c] and the channel bit rate σ. Otherwise there will in the client be provided a not shown buffer memory for a possible replay after decoding, something which will be obvious to persons skilled in the art.

Figure 2A:
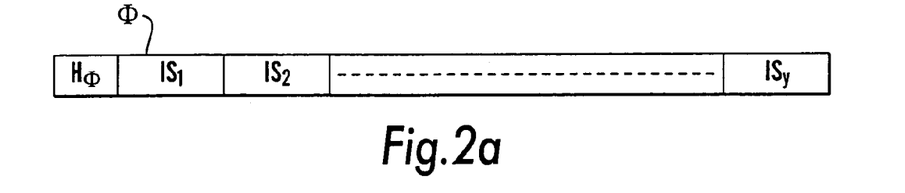
Figure 2B:
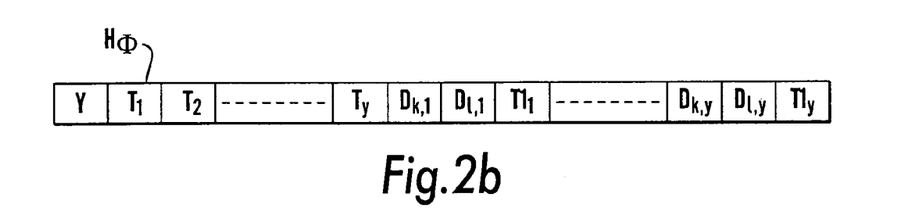

FIG. 2a shows the concatenated video file Φ the way it is stored on the HTTP server. The file Φ is as mentioned concatenated of y streams $IS_1$-$IS_y$ and comprises in addition a header $H_\Phi$ which is formatted in 4y+1 blocks. The first block Y gives the number of streams y in the file Φ. Thereafter follows y blocks $T_1$-$T_y$ which respectively state the average encoding bit rate for the respective y streams IS. Now follow in the header two blocks $D_k$, $D_1$ for each stream IS. These blocks comprise information about the distances $d_k$ and $d_l$ respectively from the beginning of the file Φ to the beginning of each stream IS and to the end of the first packet $PC_1$ in each stream IS. In addition there is for each stream IS a block II which comprises parameters for the stream IS, the block II possibly being segmented in several sub-blocks depending on the number of entered parameters. These parameters may e.g. concern a frame dimension and parameters for an audio coding. This prevents that switching in a bandwidth scaling takes place between streams with different frame dimensions, and if non-bandwidth scalable audio information is interfoliated with video information switching between streams which contain different audio encoding is prevented. Specifically in FIG. 2b the block $D_{k,l}$ gives the distance to the beginning of the stream $IS_1$ and the block $D_{l,1}$ the distance to end of the first packet $PC_1$, in the stream $IS_1$, while $II_1$ contains parameter information about the stream $IS_1$. Correspondingly the block $D_{k,y}$ gives the distance to the beginning of the last stream $IS_y$ in the file Φ, block $D_{1,y}$ the distance to the end of the first packet $PC_1$ in the stream $IS_y$ and the block $II_y$ then, of course, parameter information about the stream $IS_y$.

Figure 3A:
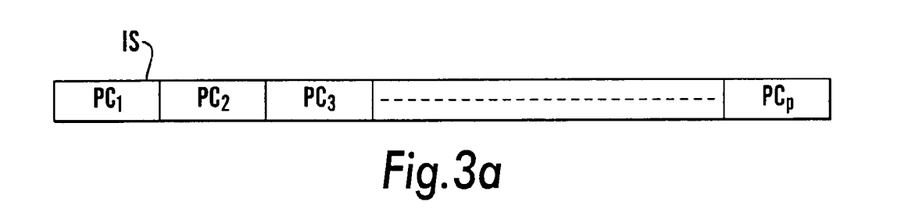

FIG. 3 shows how each stream IS is divided into p packets $PC_1$-$PC_p$. Each packet PC has the length q and preferably is the packet length at most equal to a configurable request timeout interval of the HTTP server. In addition the packet length q determines the balance between the packet overhead, the resolution in a possible search of video information and as is to be mentioned later, the time interval between a possible switching of streams IS. If these conditions are met, the packet length q may otherwise be variable.

Figure 3B:
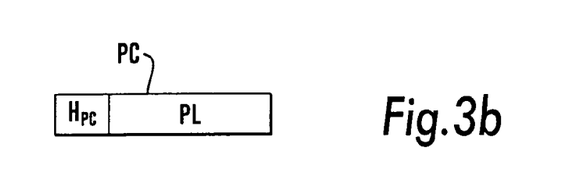
Figure 3C:
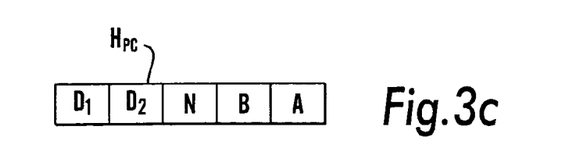

Each packet PC contains a header $H_{PC}$ and a payload PL which comprises the encoded video signals for a time segment which corresponds to the payload. The payload PL of each packet PC contains a number n of video frames which can be different from packet to packet. Further, it is necessary that the payload PL starts with an independently decodable video frame such that the decoder in the client can decode each packet independently. The header $H_{PC}$ of a packet PC is basically formatted into five blocks, wherein a first block $D_1$ contains information about the distance $d_1$ to the beginning of the following packet, a second block $d_2$ the information about the distance $d_2$ to the end of the following packet, a third block N information of the number n of video frames in the packet, the fourth block B a reference to the corresponding packet in the encoded intermediate stream $IS_b$ with a closest lower average bit rate $t[c_{k-1}]$, and a fifth block A a reference to the corresponding packet in the encoded intermediate stream $IS_a$ with a closest higher average bit rate $t[c_{k+1}]$, $t[c_k]$ being the bit rate of the current stream $IS_k$, and k, b, a ∈ y.

In addition the header $H_{PC}$ of a packet PC can further contain information which is used if a method for searching the video information is implemented, such this is to be discussed in the following.

It is to be understood that the streams IS can be provided randomly in the file Φ. The stream $IS_L$ which has the lowest bit rate $t[c_L]$ will refer only to packets in the stream with the closest higher bit rate and correspondingly the stream $IS_H$ with the highest bit rate $t[c_H]$ will refer to packet in the stream with the closest lower bit rate.

It is, however, preferred and suitable that the streams IS are provided successively with increasing bit rate t[c] in the file Φ such that the stream $IS_L$ with the lowest bit rate $t[c_L]$ becomes the first video stream $IS_1$ in the file Φ and the stream $IS_H$ with the highest bit rate $t[c_H]$ the last video stream $IS_y$ in the file Φ. Preferably the encoded streams VS;IS contain the same number of video frames F. This does not prevent that a variable video frame rate may be used as it will be possible to define an adjustment frame $F_S$ as a peculiar type of frame ("no frame") and adjusting the frame rate in each stream IS to the same rate by inserting a suitable number of adjustment frames $F_s$ in the respective streams IS. The client will then interpret an adjustment frame $F_S$ as a repetition of the preceding decoded video frame. The stream $IS_b$ which has the closest lowest bit rate $t[C_{k-1}]$ relative to the bit rate $t[c_k]$ of the current stream $IS_k$, shall have an independently decodable video frame IF at positions corresponding to the beginning of each packet in the current stream $IS_k$. Correspondingly shall the stream $IS_a$ which has the closest higher bit rate $t[c_k]$ relative to the bit rate $t[c_k]$ of the current stream $IS_k$ also have an independently decodable video frame at positions corresponding to the beginning of each packet in the current stream $IS_k$. Finally, each stream IS will be dependent on the streams with respectively the closest lower bit rate and the closest higher bit rate and this entails that the encoded streams must be processed in parallel, frame by frame.

The video file Φ with the decoded streams IS is located on an HTTP server which is adapted to a suitable version of HTTP, specifically HTTP version 1.1. Generally the transmission starts with the client first requesting the HTTP server for a fixed number of bytes. This fixed number of bytes shall include the header $H_\Phi$ of the video file Φ and the start of the first stream $VS_1$ in the video file Φ. Under certain circumstances it shall, however, not be possible to switch between all video streams IS in the file Φ. If e.g. the video streams have different frame dimensions or if the audio information which is interfoliated with the video information is not bandwidth-scalable and encoded with different values for each video stream, it will not be possible to switch between such video streams as they are not bandwidth-scalable. In order to prevent switching between video streams which are not bandwidth-scalable, the client must interpret the parameters of the header $H_\Phi$ and decide between which video streams switching can take place. It is, however, in some cases only possible to switch between a subset of the total number y video streams and the client will then, as mentioned above, generate subsets of the streams IS, such that switching between the streams IS only can take place in the subsets.

It is necessary that the client estimates the channel bit rate a during the transmission. If the estimate $\hat{\sigma}$ of the channel bit rate σ is lower than the average bit rate $t[c_k]$ of the current stream $IS_k$, it is first switched to the stream $IS_b$ with the closest lower average bit rate $t[c_k]$. If the estimate $\hat{\sigma}$ of the channel bit rate is higher than the average bit rate $t[c_k]$ of the current stream $IS_k$, switching takes place to the stream $IS_a$ with the closest higher average bit rate $t[c_{k+1}]$. If the streams IS are provided successively with increasing bit rate in the file Φ, it will of course, be the neighbouring streams $IS_{k-1}$, $IS_{k+n}$ of the current stream $IS_k$ switching in case takes place to. If the current stream $IS_k$ is the stream with the lowest bit rate $t[c_L]$ and provided as the first stream $IS_1$ in the file Φ, it can, of course, only be switched to the following stream $IS_2$. Correspondingly, if the current stream $IS_k$ is equal to the stream with the highest bit rate $IS_H$, switching can only take place to the closest preceding stream $IS_{y-1}$. By switching between the streams the encoding bit rate t[c] can be adapted to a current channel bit rate σ and it is thus achieved bandwidth-scalable video transmission over e.g. HTTP version 1.1.

Figure 4:
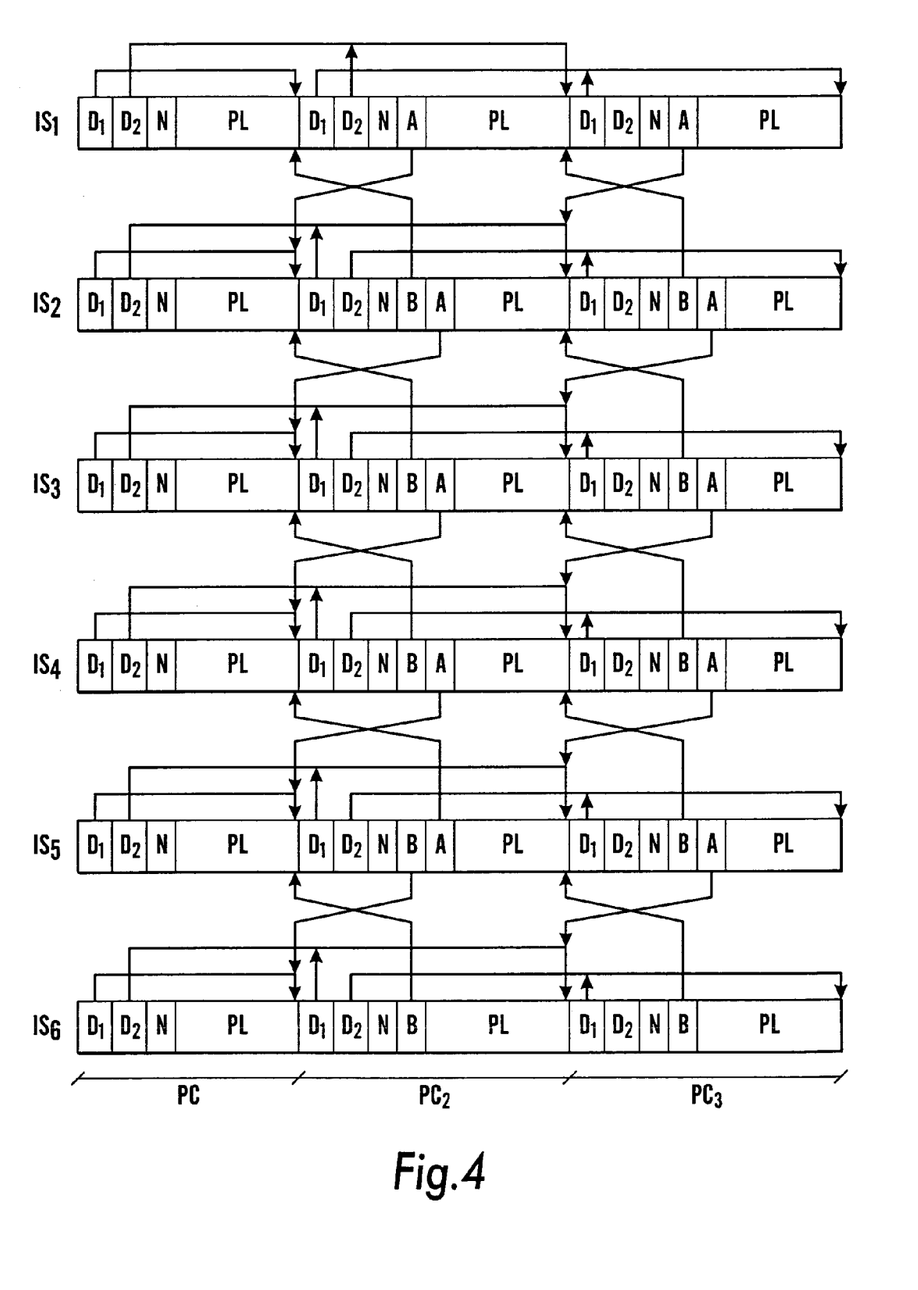

With reference to FIG. 4 there shall now be given a more specific discussion on how bandwidth-scalable video transmission is realized by switching between the video streams in the video file Φ. In FIG. 4 arrows indicate the distances whereto the distance blocks $D_1$, $D_2$ in a header $H_{PC}$ refer. Likewise are the mutual references B, A between corresponding packets in the stream indicated by arrows between the blocks. A closer discussion of how the references are used in the method for transmission will now be given in the following.

In the example in FIG. 4 there are shown six video streams $IS_1$-$IS_6$ as concatenated and which with the addition of a file header $H_Φ$ form the video file Φ. Each stream IS comprises as shown in FIG. 4, three packets and contains the same number of frames and the same video information. Both the number of streams and number of packets in each stream are, of course, wholly schematic examples and formatting in streams and packets will in reality be adapted to the circumstances which the transmission of the current video information requires. In FIG. 4 the streams may e.g. be coded with the bit rates t[c] as stated in the above example and thus cover an expected channel bit rate range of 20-500 kbits/s. Further are the streams IS in the file Φ in FIG. 4 shown provided with increasing bit rates such that the first stream $IS_1$ in the file Φ has the lowest bit rate $t[c_L]$ and the last stream $IS_6$ in the file Φ the highest bit rate $t[c_H]$.

Generally each stream IS as shown in FIG. 4 is formatted into p packets, with p=3 in FIG. 4, and each stream hence contains the same video information. In the header $H_{PC}$ of each packet there are provided two blocks which contain byte-formatted distance information. The block $D_1$ states the distance $d_1$ to the beginning of the following packet and the block $D_2$ the distance $d_2$ to the end of the following packet in the stream. As soon as the two distance blocks $D_1$, $D_2$ are received for a packet, a request is made for the following packet in the stream. The sequencing of the packet requests in this way eliminates the roundtrip delay in the network. The requests for packets terminate when two distance blocks $D_1$, $D_2$ containing the number 0 are received.

The header $H_{PC}$ of the packets PC further contains two information blocks which are used for switching between streams, namely the information block B which refers to the corresponding packet in the stream with the closest lower bit rate and the information block A which refers to the corresponding packet is the stream with the closest higher bit rate. As the streams IS are provided in FIG. 4, namely with increasing bit rates t[c], the blocks B and A respectively shall refer to the neighbour streams of the current stream. As shown in FIG. 4 the first packet in each of the streams IS does not contain the blocks A and B. When the current channel bit rate σ is estimated, something which takes place when the request for the header $H_Φ$ in the video file Φ is made, the blocks T with bit rate information will then indicate which stream is desired and the distance blocks $D_k$ and $D_l$ shall indicate the distance from the beginning of the file Φ to respectively the beginning of the desired video stream IS and to the end of the first packet $PC_1$ in this video stream. There is, however, nothing preventing that the blocks B, A yet could be provided in the header in the first packet $PC_1$ in each stream IS, but this is, as will be seen, a superfluous measure. As the streams, as shown in FIG. 4, are provided with increasing bit rates, also the stream $IS_1$, i.e. the stream $IS_L$ with the lowest bit rate $t[c_L]$, can only refer to the stream with the closest higher bit rate and the headers of the packets in the stream $IS_1$, will hence, of course, only contain the distance block A which refers to the strewn with the closest lower bit rate, viz. the stream $IS_2$. Correspondingly the stream $IS_6$ which corresponds to the stream $IS_H$ with the highest bit rate $t[c_L]$ can only refer to the stream with the closest lower bit rate, viz. the stream $IS_5$. Hence the header of the packet $PC_1$ of the stream $IS_6$ does not contain the A block, but only the B block which refers to the stream with the closest lower bit rate. It may be mentioned that the blocks B, A can only be introduced in positions wherein both the video frame F in the current stream $IS_k$ and the streams $IS_{k-1}$, $IS_{k+1}$ (or $IS_B$, $IS_A$ in randomly provided streams) are intraframes IF. Intraframes IF are independently coded video frames. Further must respective packets have the same length in the streams $IS_k$, $IS_{k-1}$, $IS_{k+1}$.

In order to switch from a current stream to the streams with the closest higher or lower bit rates $t[c_{k+1}]$, $t[c_{k-1}]$ according to how the channel bit rate σ varies, there are requested two byte-formatted distance block $D_1$, $D_2$ with fixed size and which start at the indicated distance in the stream to which switching is desired, and this stream, such as being exemplified in FIG. 4, of course, will be one of the neighbour streams. At the moment the clients receive the blocks $D_1$, $D_2$ the request sequence is broken and as soon as the next packet is requested, the request sequence is reintroduced. Hence switching between streams IS only introduces a single roundtrip delay, which again reduces the effective channel bit rate σ. It will be possible to use only one single byte-formatted distance block in each packet, as this block then gives the size of the next packet. This would, however, result in two roundtrip delays during switching between the streams IS. In order to avoid rebuffering during downloading or replay in the client, it is essential that the switching between the streams takes place quickly. Consequently, two distance blocks $D_1$, $D_2$ are used in each packet even if this increases the packet overhead.

Obviously the overhead of bandwidth-scalability will be reversibly proportional to the packet length q, as larger packets result in less packet overhead. However, large packets will increase the interval during which the switching between the streams IS may be performed. In order to avoid the rebuffering during downloading or playback in the client, it is important that this interval is not too long. Expediently it is in the method for transmission according to the present invention chosen to employ packets with a duration of about 15 seconds. This gives a typical packet overhead of 0.20 kilobits/s, dependent on the size of the HTTP response and request.

During the initial connection the client requests a predetermined number of bytes. The response shall comprise the header $H_Φ$ of the video file Φ and the first part of the first stream $IS_1$. During the response the channel bit rate σ is estimated. Based on the estimate $\hat{σ}$ the initial stream in the transmission is selected. If the initial stream is not the stream $IS_1$ in the video file Φ, the initial byte as already received from the stream $IS_1$ is discarded. If the initial stream is the stream $IS_1$, the next response continues from the place where the initial request ended. As the stream $IS_1$ as shown in the example is the stream encoded with the lowest bit rate $t[c_L]$, initial buffering is minimized for channels with low bit rate σ.

Concerning the estimation of the channel bit rate it will be obvious to persons skilled in the art that this can take place in different ways.

In the present invention the basis for a preferred method for estimating the channel bit rate σ is that the video encoder generates the bit stream with variable bit rate. Each video stream is encoded with a determined average target bit rate t[c]. Quantization and the frame rate during the video encoding are adjusted by some suitably selected rate control average which ensures that the target bit rate is met and in addition that a buffering in the encoder is maintained on some predetermined value during the encoding of the whole video sequence. On the other hand, the client must buffer a predetermined amount of data before the decoding starts.

In addition the client will also have to buffer decoded data before playback after digital/analog conversion, but this is as mentioned irrelevant in the present case. If the channel bit rate σ now is equal to the target bit rate t[c] for the video stream IS, rebuffering in the client is avoided before the decoding. The channel bit rate can be different for the various clients and furthermore fluctuate systematically. In order to avoid rebuffering in the buffer or cache memory of the client preceding the decoding, the method for transmission according to the present invention provides bandwidth scaling by switching between streams with different target bit rates t[c]. This switching is as mentioned made on basis of estimation of the channel bit rate σ. The estimator is quite simply $\hat{\sigma}=x/\tau$, where x is the number of buffered bits in the time interval τ. As it is only possible to switch between streams at the boundaries of the packets PC, the resolution in X is equal to the packet length q. The following heuristic is used for deciding when switching between the streams shall take place:

1) if $\hat{\sigma}>t[c_k]$ and the buffered length less than twice minimum packet length, then switching takes place to the stream $IS_a$ with the closest higher target bit rate $t[c_a]$, or
2) if $\hat{\sigma}<t[c_k]$ and buffer length less than minimum packet length, then switching takes place to the stream $IS_b$ with the closest lower target bit rate $t[c_b]$.—With minimum packet length it shall be understood the value of q which is used when the video file Φ is generated. The method disclosed herein for estimation of the channel bit rate σ is easy to implement, as it is based on the buffer length and the packet length.

In principle an instant estimation not dependent on buffer length and packet length may also be used. For instance it will be possible to use the time derivative of σ as estimator for the channel bit rate σ. The estimator $\hat{\sigma}$ is in other words $$d\sigma = \frac{d^2x}{dt^2}.$$

The switching then takes place under the following conditions:

1) If σ>0, switching takes place to the stream $IS_a$ with the closest higher target bit rate $t[c_a]$,
2) If σ<0, switching takes place to the stream $IS_b$ with the closest lower target bit rate $t[c_b]$.

Preferably the switching in practice will take place by σ becoming equal to and exceeding a boundary value Δσ, such that $|\sigma|\geq|\Delta\sigma|$. This boundary value may then be predetermined on basis of the selected encoding bit rates t[c] and the client buffer capacity in connection with decoding. Due to any unequal distance between the average selected encoding bit rates t[c] it is advantageous to scale Δσ independently of the sign of σ and the current encoding bit rate $t[c_k]$, such that switching between e.g. six streams $IS_1$-$IS_6$ takes place with the use of 2·4+2=10 preselected values for Δσ. For each of the streams $IS_L$ and $IS_H$ it will then be assigned one single respective boundary value as switching only will take place to the stream with respectively the closest higher or the closest lower encoding bit rate.

Alternatively the estimation of the channel bit rate σ also may take place by repeatedly integrating the channel bit rate σ over succeeding time intervals $\tau=t_a-t_b$, where $t_a$ is the upper boundary and $t_b$ the lower boundary for the interval τ, and to perform the switching by comparing the integration results $\Sigma_1, \Sigma_2$ for respectively the succeeding time intervals $\tau_1, \tau_2$ such that switching to a stream $IS_a$ with the closest higher bit rate $t[c_a]$ takes place if $\Sigma_2-\Sigma_1>0$, and correspondingly to a stream $IS_b$ with the closest lower bit rate if $\Sigma_2-\Sigma_1<0$. Preferably the switching also in these cases takes place when a boundary value ΔΣ is reached or exceeded, such that $|\Sigma_2-\Sigma_1|\geq|\Delta\Sigma|$. The boundary value can be predetermined on the same basis as the boundary value Δσ for the time-derivated channel bit rate σ, and advantageously scaled in analogy with the scaling of Δσ.

Whether the time-derivated or the integration result is used as estimator for the channel bit rate, it must in the determination of time intervals and boundary values be taken into account that in both the channel bit rate σ and the encoding bit rate t[c] may appear short, non-periodic and random fluctuations. Time intervals and boundary values must hence be selected significantly larger than respectively the maximum duration and amplitude of fluctuations of this kind.

In connection with the method for transmission of video information according to the present invention, it will be desirable that the client can execute search and retrieval of the transmittable video information which is entered in the video file Φ in form of video streams IS and encoded with respectively different bit rates t[c] corresponding to the expected channel bit rates σ of the client. As the streams IS furthermore are formatted with the view that transmission shall take place over a suitable version of HTTP as transport protocol, the search may use the information that already is present in the header $H_{PC}$ in the packets PC of the packet-formatted video streams IS. The video information can comprise sequences of video frames which have a mutual semantic relation, in casu video films, but may also be comprised by single frames or still frames. It is hence desirable that search and retrieval of video information are directed towards single frames. On the other hand it is obvious that an exact search and retrieval of a single frame and downloading thereof shall be very demanding in regard of resources. The method for client-executed search and retrieval of information according to the invention is hence basically searching for single frames, but the retrieval takes place by localizing this single frame in a sequence of frames, which can comprise up to several packets PC in a video stream IS and then finding and downloading the packet where the single frame is located. In practice this implies that the search and retrieval according to the invention are realized as a pseudorandom search. This is achieved by providing further information in the header of some packets in the video streams, as this is to be explained in greater detail with reference to FIGS. 5a-5d.

Figure 5A:
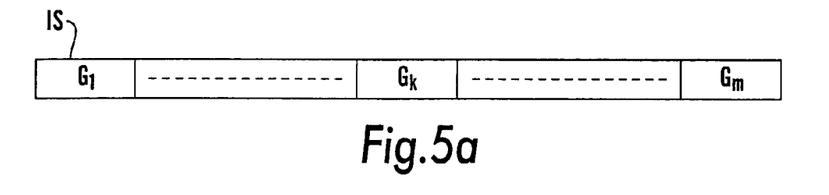
Figure 5B:
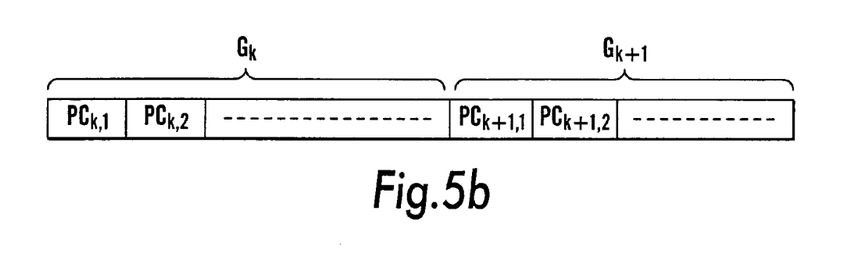
Figure 5C:
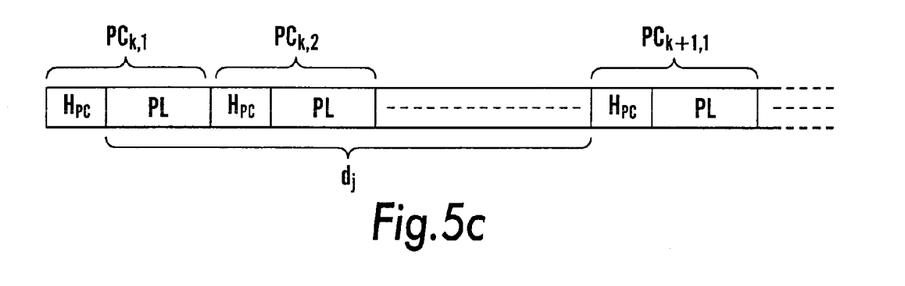
Figure 5D:
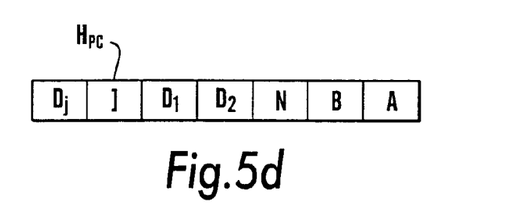

As shown in FIG. 5a a video file is divided into m groups $G_1 \ldots G_m$ and each of these groups comprises a number of r packets PC as shall be explained more closely with reference to FIG. 5b. It is to be understood that the number r may differ between the various groups, but it will be quite natural that r is a fixed number. If the number of packets in the stream then is not a multiple of r, the last group in the stream will, of course, have a number of packets which is less than the chosen fixed number r. An arbitrarily selected group $G_k$, k∈m, hence comprises packets $PC_{k,1}, PC_{k,2} \ldots PC_{k,r}$. The first following group $G_{k+1}$ then of course, comprises corresponding packets $PC_{k+1,1}, PC_{k+1,2}, \ldots PC_{k+1,r}$. The header $H_{PC}$ in the first packet $PC_{k,1}$ in an arbitrary group $G_k$, $k \in m$ must in order to realize the method for search and retrieval additionally comprise two information blocks beyond those shown in FIG. 3c, viz. an information block $D_j$ and an information block J. The information block $D_j$ contains information about a jump offset $d_j$ which corresponds to the total length of the packets in the group $G_k$ and the information block J contains information about the number of frames which are included in the jump offset $d_j$ and the first packet $PC_{k+1,1}$ in the following group $G_{k+1}$. It will now be seen that the division in groups G is conventionally given by $d_j$ and not physical.

In the method for search and retrieval according to the invention there is first generated a request to the HTTP server for downloading the header $H_{PC}$ of the first packet $PC_{k,1}$ in e.g. an incident group $G_k$, $k \in m$, in a video stream $IS_k$, $k \in y$. The block $D_j$ gives the distance $d_j$ to the beginning of the packet $PC_{k+1,1}$ as already mentioned and shown in FIG. 5c, while the block J, of course, then gives the number j of video frames included in the jump offset and in the first packet $PC_{k+1,1}$ in the following group $PC_{k+1}$. If now the desired frame is $F_x$, the number x of this frame is compared with j, and if $x \in j$, the transmission and decoding of the video stream are resumed from and including the first frame in the packets where the frame $F_x$ is located, as this packet must be one of the packet in the group $G_k$ and the first packet $PC_{k+1,1}$ in the following group $G_{k+1}$. The number n of frames in each packet is namely given by the block N in the header of the packets and it is then seen that $j=n_{k,1}+n_{k,2}+\ldots+n_{k,r}+n_{k+1,1}$, i.e. the sum of all frames in the group $G_k$ and the number of frames in the following packet $PC_{k+1,1}$ in the next group $G_{k+1}$. The packet where frame $F_x$ is located will now be found and the transmission and decoding of the video stream then take place from the first frame of this packet.

If now $x \notin j$, the header $H_{PC}$ of the first packet $PC_{k+1,1}$ in the next group $G_{k+1}$ is requested, the header of this packet similarly comprising the block $D_j$ with information about the jump offset for the group $G_{k+1}$ and the block J which gives the number of frames j of the packets in this group and the first packet $G_{k+2,1}$ in the next group. If now $x \in j$, the video stream is transmitted and decoded from and including the first frame in the packet where the searched frame is located and if $x \notin j$, the process is repeated on the packets in the following group until the desired frame $F_x$ is found. Hence a frame-directed packet-formatted search and retrieval of video information are realized with the use of a suitable version of HTTP as transport protocol. The search takes place in jumps over a sequence of jump offset $d_j$, something which contributes to reduce the search time. When the desired video frame $F_x$ is located within the stated frame number range j, the search is limited to finding the packet which contains the desired frame $F_x$ such this will be given in the header of the first packet in the group by the blocks $D_j$ and J, as well as the block N in the header of each of the packets which is included in the group and the first following packet after the group. As the search is limited only to finding the packet containing a desired picture, it car, be described as a pseudorandom search. It is to be remarked that the jump offset $d_j$ influences both the overhead and the response time of pseudorandom search. The overhead in pseudorandom search is namely inversely the proportional to the jump offset $d_j$, as a larger jump offset $d_j$ results in a smaller overhead. The use of a jump offset of e.g. 25 packets PC, i.e. r=25, gives typically a packet overhead of 0.02 kilobits/s, which is insignificant. The search time is dominated by the roundtrip delay in the network, as no pipelining of the request takes place and only a part of the packet header $H_{PC}$ in fact is necessary. It is also seen that the resolution in a pseudorandom search of this kind is determined by the packet length q which in its turn is substantially given by the number of frames n in each packet.

Figure 6A:
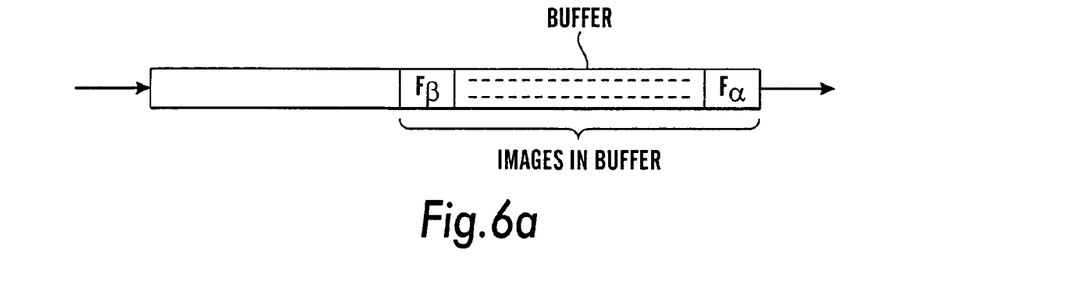

The search and retrieval of video information can take place already from the initialization of transmission, as it is quite natural to request the header of the first packet $PC_{1,1}$ in the first group $G_1$ in the initial video stream $IS_k$. If a part of the video stream IS already has been downloaded and decoded, search and retrieval can of course start from an incident packet $G_k$, the sequence of frames $F_\alpha, \ldots F_\beta$ which is located in the client buffer then being frames contained in the packets of the current groups. It shall in this connection be remarked that the cache memory at most stores a few packets, but the frames which are present in the buffer could e.g. very well be from the last packet in the group $G_{k-1}$ and from the following group $G_k$. The information about frames and jump offsets $d_j$ could then hence appropriately be related to the position of respectively the first frame $F_\alpha$, i.e. the frame with the lowest number in the buffer, and the last frame $F_\beta$, i.e. the frame with the highest number in the buffer, as shown in FIG. 6a. This shall be explained in more detail with reference to the flow diagram in FIG. 6b.

Figure 6B:
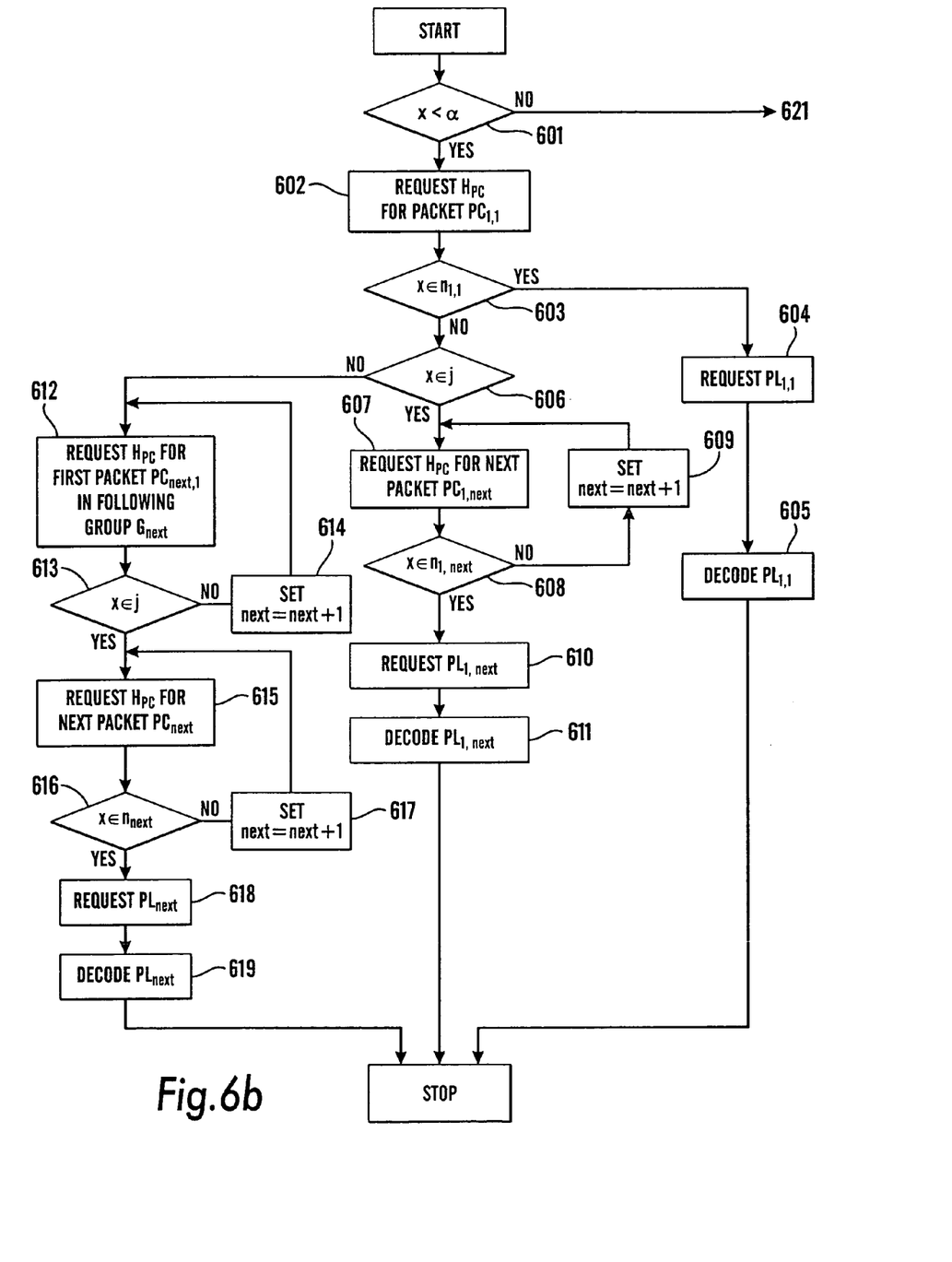

According to the flow diagram in FIG. 6b, step 601 asks if $x<\alpha$. This means that the desired frame $F_x$ in a stream IS has a lower number than $F_\alpha$ and in step 602 hence the header $H_{PC}$ of the very first packet $PC_{1,1}$ in the stream is requested. Step 603 asks whether x is located among the frames in this packet and if the answer is yes, the payload PL of the packet $PC_{1,1}$ is requested in step 604 and decoding of the payload in step 605, whereafter the frame $F_x$ will be found and the process ends. If the answer is no, step 606 asks whether x is located among the frames j which are included in the jump offset $d_j$ as given in the first packet $PC_{1,1}$ and the frames in the following group's first packet $PC_{2,1}$. If the answer is yes, the header $H_{PC}$ of the next packet, i.e. the second packet $PC_{1,2}$ both in the stream IS and the first group $G_1$ in the stream IS is requested in step 607. Step 608 asks if x is found among the frame numbers n of this packet, and if the answer is no, an iteration is taking place in step 609 and the process is repeated for the next packet $PC_{1,next}$ in step 608. Is the answer in each case yes, the payload of this packet is requested in step 610 and decoding of the payload in step 611, whereafter the process stops. If the answer in step 606 on the contrary is that x is not contained in j, the process proceeds to step 612 where the header of the first packet $PC_{next,1}$ in the following group $G_{next}$, i.e. the second group $G_3$ in the stream IS is requested. If the answer in step 613 is no to the question whether x is contained in the frame number which is included in the jump offset $d_j$ and the frames of the first packet in the following group $G_{next+1}$, in this case i.e. the third group in the stream IS, step 614 returns to step 612, as now the first packet in the next group $G_{next+1}$, i.e. in the present case group $G_3$ etc., is requested iteratively. If the answer in step 613 on the contrary is yes, the header $H_{PC}$ of the next packet $PC_{next}$ in the group is requested and if x is not found among the frame numbers $n_{next}$ of this packet, one returns via step 617 back to step 615 and the next following packet is requested, whereafter the process continues. If the answer in step 616 on the contrary is yes, the payload of the packet in question requested and in step 619 the payload is decoded, whereafter the process stops.

If the answer in step 601 is no, the process proceeds to step 621 which asks if x is greater than the number $\beta$ of the last frame $F_\beta$ in the buffer. If the answer is no, this means that the desired frame $F_x$ is to be found among the frames in the buffer and hence immediately will be decoded, wherefore the process stops. If the answer on the contrary is yes, i.e. that the number x of the desired frame $F_x$ is greater than the number of $F_\beta$, the header of the following packet $PC_{k,y}$ is requested in step 622 and step 623 askes if x is found among the frame numbers of this packet. If the answer is yes, the payload $PL_{k,y}$ of the packet $PC_{k,y}$ is requested in step 624 and in step 625 the payload $PL_{k,y}$ is decoded, whereafter the process stops. If the answer on the contrary is no in step 622, step 626 asks whether the block J is to be found in the header $H_{PC}$ of the packet $PC_{k,\gamma}$. If the answer is no, one returns via step 627 to step 622 and now the header $H_{PC}$ of the next following packet $PC_{k,\gamma+1}$ is requested, whereafter the process continues. If the answer in step 626 on the contrary is yes, step 628 asks whether the number x is contained in j which gives the frame numbers included in the jump offset $d_j$ and the payload of the first packet $PC_{k+1,1}$ in a following group $G_{k+1}$. If the answer in step 628 is yes, the header $H_{PC}$ of the following packet $PC_{k,\gamma+1}$ is requested in step 629 and in step 630 it is asked whether x is to be found among the frame numbers of this packet. If this is not the case, an iteration takes place via step 631 and the header of the next following packet is requested, whereafter the process continues. If the answer in step 630 is yes, the payload $PL_{k,\gamma+1}$ of the packet $PC_{k,\gamma+1}$ is requested in step 632 and in step 633 the payload is decoded, whereafter the process ends. If the answer in step 628 is no, the header $H_{PC}$ of the first packet $PC_{k+1,1}$ in the following group $G_{k+1}$ is requested in step 634 and step 635 asks whether x is contained among the frame numbers included in the jump offset $d_j$ for the group $G_{k+1}$ and the first packet $PC_{k+1,1}$ in the following group $G_{k+2}$. If the answer is no, an iteration takes place in step 636 back to step 634 and now the header of the first packet in the next following group is requested whereafter the process continues. If the answer in step 635 is yes, the header $H_{PC}$ of the next packet $PC_{k+\gamma,next}$, i.e. the second packet in the group $G_{k+\gamma}$ is requested in step 637 and if x is not found among the frame numbers of this packet, one continues via step 639 to the next packet etc., whereafter the process continues. If the answer in step 638 is yes, the payload $PL_{k+1,next}$ of the packet $PC_{k+1,next}$ is requested in step 640 and decoding of the payload in step 641, whereafter the process stops.

In the manner disclosed herein it becomes possible to find a desired frame $F_x$ by finding and decoding the packet which contains $F_x$. The search for $F_x$ can be initiated during the transmission of a stream as shown in FIG. 6b, but can also be initiated already when the transmission of the stream itself starts. It is understood that it will be possible to switch between the streams IS during the search as the channel bit rate σ varies using the method for transmission according to the invention.

In connection both with the transmission and search it, a stack list for HTTP requests is generated and maintained. A request may then be placed in the stack list when it is sent from the client and it is removed therefrom only when the received response from the HTTP server has been processed. If a disconnection takes place between HTTP server and client during the transmission of video information and reception of the response, the request in the stack list is sent anew when the connection has been reestablished. If a disconnection takes place in connection with the reception of the packet, the first request in the list can be updated and the beginning of the packet is then adjusted for the data that may already have been received.

The invention claimed is:

1. A method in transmission on request of video information in a shared network resource, wherein the shared network resource particularly is Internet, an intranet or extranet, wherein the video information is stored in the form of an encoded video file on HTTP servers in the shared network resource and accessed by clients via HTTP (Hypertext Transfer Protocol), wherein each client has a video decoder, and wherein the initial video information is in the form of digitized video signals, characterized by comprising steps for generating by means of a video encoder y multiple encoded video streams (VS) which each comprises the video signals of the initial video information compressed with average bit rates t[c] which covers the clients' expected channel bit rates σ, the video encoder generating independently decodable video frames at given time intervals;

generating y encoded intermediate streams (IS) from the corresponding encoded video streams (VS) by dividing an encoded video stream in p packets (PC) with varying lengths q, each packet (PC) comprising a header ($H_{PC}$) and a payload (PL) which contains the encoded video signals for a time segment corresponding to the payload;

providing the header ($H_{PC}$) with the following information:
 (i) the distances $d_1$ and $d_2$ respectively from the beginning and to the end of the nearest following packet,
 (ii) the number n of video frames (F) that the packet comprises, and
 (iii) a reference to the corresponding packet in respectively the encoded intermediate stream ($IS_b$) with a closest lower average bit rate t[$c_{K-1}$] and the coded intermediate stream ($IS_a$) with a closest higher average bit rate t[$c_{k+1}$], t[$c_k$] being the bit rate for the present intermediate stream ($IS_k$) and k, b, a ∈ y;

providing an independently decodable video frame (IF) at the beginning of the payload (PL) of a packet (PC);

concatenating the intermediate streams (IS) into a final file (Φ) which is stored on one or more HTTP servers; and providing the final file (Φ) with a header ($H_Φ$) which contains information about the parameters of the streams (IS); and further by the following steps effected by the client:

generating a request for the header (HΦ) and the beginning of the first stream ($IS_1$) in the final file (Φ);

estimating the channel bit rate σ and selecting the stream ($IS_k$) whose bit rate t[$c_k$] is the closest bit rate relative to the estimated channel bit rate $\hat{\sigma}$, as the initial stream of the transmission, such that t[$c_k$]≈σ, and then estimating the channel bit rate a during the transmission and, if the estimate $\hat{\sigma}$ is lower than the average bit rate t [$c_k$] of the current stream ($IS_k$), switching to the stream ($IS_b$) with the closest lower average bit rate t[$c_k$] or, if the estimate $\hat{\sigma}$ is higher than the average bit rate t[$c_k$] of the current stream ($IS_k$), switching to the stream ($IS_a$) with the closest higher average bit rate t [$c_{k+1}$], the switching of the streams taking place on the basis of the packet references and realizing a bandwidth-scaleable video transmission over HTTP.

2. A method according to claim 1, characterized by estimating the channel bit rate a on the basis of an estimator $\hat{\sigma}=x/\tau$ wherein $\hat{\sigma}$ is the estimated channel bit rate and x the number of buffered bits in the time interval a, such that if $\hat{\sigma}>t[c_k]$ and a buffer length less than twice the minimum packet length, switching takes place to the stream with a closest higher target bit rate t[$c_a$], or, if $\hat{\sigma},<t[c_k]$ and the buffer length less than minimum packet length, switching takes place to the stream with a closest lower target bit rate t[$c_b$].

3. A method according to claim 1, characterized by estimating the channel bit rate a on the basis of an estimator $$d\sigma = \frac{d^2 x}{dt^2},$$

such that if σ>0, switching takes place to the stream with a closest higher target bit rate t[$c_a$], or, if σ<0, switching takes place to the stream with the closest lower target bit rate t[$c_b$].

4. A method according to claim 3, characterized by determining a boundary value $\Delta\sigma$, such that switching takes place if $|\sigma| \geqq |\Delta\sigma|$.

5. A method according to claim 1, characterized by estimating the channel bit rate $\sigma$ by repeatedly integrating the channel bit rate $\sigma$ over succeeding time intervals $\tau = t_a - t_b$, $t_a$ and $t_b$ being respectively an upper and lower boundary for the interval $\tau$ and an integration result $\Sigma$ is given by $$\sum = \int_{t_b}^{t_a} \sigma \, dt,$$

dt, and comparing the integration results $\Sigma_2$, $\Sigma_1$ for respective succeeding time intervals $\tau_2$, $\tau_1$, such that if $$\sum\nolimits_2 - \sum\nolimits_1 > 0,$$

switching takes place to the stream with a closest higher target bit rate $t[c_a]$, or, if $\Sigma_2 - \Sigma_1 < 0$, switching takes place to stream with a closest lower target bit rate $t[c_b]$.

6. A method according to claim 5, characterized by determining a boundary value $\Delta\Sigma$, such that switching takes place if $|\Sigma_2 - \Sigma_1| \geqq |\Delta\Sigma|$.

7. A method according to claim 1, characterized by using a HTTP server adapted to HTTP version 1.1.

8. A method according to claim 7, characterized by the video transmission taking place over HTTP version 1.1.

9. A method according to claim 1, characterized by providing the packets (PC) of the streams (IS) in non-overlapping successive groups (G) of two or more successive packets, such that each stream (IS) is divided into m groups of this kind, and providing the header of the first packet ($PC_{k,1}$) in a group ($G_k$, k∈m) with information of a jump offset $d_j$ which corresponds to the combined lengths of the packets in the group ($G_k$) and the number j of frames (F) which is covered by the jump offset $d_j$ and the first packet ($PC_{k+1,1}$) in the following group ($G_{k+1}$).

10. A method according to claim 1, characterized by providing the streams (IS) at random in the final file ($\Phi$), and by the stream ($IS_L$) with the lowest bit rate $t[c_L]$ referring only to packets of the stream with the closest higher bit rate and the stream ($IS_H$) with the highest bit rate $t[c_H]$ referring only to packets in the stream with the closest lower bit rate.

11. A method according to claim 1, characterized by providing the streams (IS) successively with the increasing bit rate $t[c]$ in the final file ($\Phi$), such that the stream ($IS_L$) with the lowest bit rate $t[c_L]$ is the first video stream ($IS_1$) of the file ($\Phi$) and the stream ($IS_H$) with the highest bit rate $t[c_H]$ is the last video stream ($IS_y$) of the file ($\Phi$).

12. A method according to claim 1, characterized by the streams ($IS_b$) and ($IS_a$) containing an independently decodable video frame (IF) at positions corresponding to the beginning of each packet (PC) in the current stream ($IS_k$).

13. A method according to claim 1, characterized by the decoded streams (VS;IS) containing the same number of video frames (F).

14. A method according to claim 1, wherein the streams (IS) have different frame rates, characterized by defining an adjustment frame ($F_s$) as a particular frame type and adjusting the frame rates of each stream (IS) to the same rate by inserting a suitable number of adjustment frames in the respective streams.

15. A method according to claim 1, characterized by the packet length q at most being equal to a configurable request time-out interval for a HTTP server.

16. A method according to claim 1, characterized by processing the encoded streams (IS) in parallel frame by frame.

17. A method according to claim 1, characterized by the header ($H_\Phi$) of the final file ($\Phi$) comprising information of the number y streams (IS) of the file, the average bit rate $t[c]$ of each stream and the distances $d_k$ and $d_l$ from the beginning of the final file to respectively the beginning of each stream and to the end of the first packet ($PC_1$) in each stream (IS).

18. A method according to claim 1, characterized by the client on the basis of the parameters of the video streams generating subsets of the streams (IS), the switching between the streams (IS) only taking place in these subsets.

19. A method according to claim 1, characterized by generating and maintaining a stack list for HTTP requests, a request being placed in the stack list at transmission and removed therefrom after processing the response received from the HTTP server, and by the requests in the stack list being retransmitted at reestablished connection after a possible disconnection between the HTTP server and client during reception of the response.

20. A method according to claim 19, characterized by updating the first request if a disconnection takes place during reception of a packet (PC), the beginning of the packet (PC) being adjusted for the possibly already received data.

21. A method according to claim 1, wherein the band width scalable transmission takes place over a version of HTTP which allows persistent connection and specification of byte range.

\* \* \* \* \*